United States Patent
Martin et al.

(10) Patent No.: US 9,110,838 B2
(45) Date of Patent: Aug. 18, 2015

(54) APPARATUS AND METHOD FOR SYNCHRONIZING DYNAMIC PROCESS DATA ACROSS REDUNDANT INPUT/OUTPUT MODULES

(71) Applicant: Honeywell International, Inc., Morristown, NJ (US)

(72) Inventors: Charles Martin, Blue Bell, PA (US); Daniel R. Shakarjian, Horsham, PA (US); Igor Chebruch, Warminster, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/955,998

(22) Filed: Jul. 31, 2013

(65) Prior Publication Data

US 2015/0039786 A1  Feb. 5, 2015

(51) Int. Cl.
*G06F 3/00* (2006.01)
*G06F 13/12* (2006.01)

(52) U.S. Cl.
CPC .................... *G06F 13/122* (2013.01)

(58) Field of Classification Search
None
See application file for complete search history.

(56) References Cited

U.S. PATENT DOCUMENTS

| | | |
|---|---|---|
| 4,527,271 A | 7/1985 | Hallee et al. |
| 4,679,189 A | 7/1987 | Olson et al. |
| 5,125,102 A | 6/1992 | Childress et al. |
| 5,537,414 A | 7/1996 | Takiyasu et al. |
| 5,566,356 A | 10/1996 | Taketsugu |
| 5,664,195 A | 9/1997 | Chatterji |
| 5,749,053 A | 5/1998 | Kusaki et al. |
| 5,898,826 A | 4/1999 | Pierce et al. |
| 5,966,301 A | 10/1999 | Cook et al. |
| 5,997,166 A | 12/1999 | Flood |
| 6,141,769 A | 10/2000 | Petivan et al. |
| 6,192,232 B1 | 2/2001 | Iseyama |
| 6,256,297 B1 | 7/2001 | Haferbeck et al. |
| 6,292,905 B1 | 9/2001 | Wallach et al. |
| 6,374,352 B1 | 4/2002 | Goldman et al. |
| 6,427,071 B1 | 7/2002 | Adams et al. |

(Continued)

FOREIGN PATENT DOCUMENTS

| | | |
|---|---|---|
| DE | 4134207 C1 | 4/1993 |
| DE | 103 14 721 A1 | 11/2004 |

(Continued)

OTHER PUBLICATIONS

Salman Taherian, et al., "Event Dissemination in Mobile Wireless Sensor Networks", 2004 IEEE International Conference on Mobile Ad-Hoc and Sensor Systems, p. 573-575.

(Continued)

*Primary Examiner* — Elias Mamo

(57) ABSTRACT

A method includes receiving first data at a first I/O module from a second I/O module, where the first data defines a programmable device configuration. The method also includes configuring a programmable device in the first I/O module based on the first data, where the programmable device is associated with a first I/O channel of the first I/O module. The method further includes receiving second data at the first I/O module from the second I/O module, where the second data is associated with a second I/O channel of the second I/O module. In addition, the method includes synchronizing the first I/O channel with the second I/O channel based on the second data.

20 Claims, 3 Drawing Sheets

(56) References Cited

U.S. PATENT DOCUMENTS

| | | |
|---|---|---|
| 6,437,692 B1 | 8/2002 | Petite et al. |
| 6,631,416 B2 | 10/2003 | Bendinelli et al. |
| 6,694,447 B1 | 2/2004 | Leach et al. |
| 6,701,453 B2 | 3/2004 | Chrabaszcz |
| 6,751,219 B1 | 6/2004 | Lipp et al. |
| 6,847,316 B1 | 1/2005 | Keller |
| 6,850,486 B2 | 2/2005 | Saleh et al. |
| 6,917,584 B2 | 7/2005 | Kuwabara |
| 6,963,781 B2 | 11/2005 | Fehrer et al. |
| 7,031,308 B2 | 4/2006 | Garcia-Luna-Aceves et al. |
| 7,035,937 B2 | 4/2006 | Haas et al. |
| 7,058,848 B2 | 6/2006 | Sicola et al. |
| 7,190,961 B2 | 3/2007 | Burr |
| 7,203,743 B2 | 4/2007 | Shah-Heydari |
| 7,233,568 B2 | 6/2007 | Goodman et al. |
| 7,236,987 B1 | 6/2007 | Faulkner et al. |
| 7,240,188 B2 | 7/2007 | Takata et al. |
| 7,275,157 B2 | 9/2007 | Cam Winget |
| 7,321,981 B1 | 1/2008 | Muntz |
| 7,366,114 B2 | 4/2008 | Park et al. |
| 7,440,735 B2 | 10/2008 | Karschnia et al. |
| 7,460,865 B2 | 12/2008 | Nixon et al. |
| 7,487,531 B1 | 2/2009 | Vogel et al. |
| 7,620,409 B2 | 11/2009 | Budampati et al. |
| 7,688,802 B2 | 3/2010 | Gonia et al. |
| 7,802,016 B2 | 9/2010 | Eimers-Klose et al. |
| 8,086,898 B2 | 12/2011 | Kase |
| 8,108,853 B2 | 1/2012 | Bale et al. |
| 8,359,112 B2 * | 1/2013 | Kephart et al. ................ 700/82 |
| 8,498,201 B2 | 7/2013 | Budampati et al. |
| 8,549,352 B2 | 10/2013 | Kranz et al. |
| 2002/0072329 A1 | 6/2002 | Bandeira et al. |
| 2002/0120671 A1 | 8/2002 | Daffner et al. |
| 2002/0122230 A1 | 9/2002 | Izadpanah et al. |
| 2002/0176396 A1 | 11/2002 | Hammel et al. |
| 2003/0003912 A1 | 1/2003 | Melpignano et al. |
| 2003/0005149 A1 | 1/2003 | Haas et al. |
| 2003/0065974 A1 | 4/2003 | Lam et al. |
| 2003/0177150 A1 | 9/2003 | Fung et al. |
| 2003/0212768 A1 | 11/2003 | Sullivan |
| 2004/0010694 A1 | 1/2004 | Collens et al. |
| 2004/0028023 A1 | 2/2004 | Mandhyan et al. |
| 2004/0029553 A1 | 2/2004 | Cain |
| 2004/0083833 A1 | 5/2004 | Hitt et al. |
| 2004/0174829 A1 | 9/2004 | Ayyagari |
| 2004/0230899 A1 | 11/2004 | Pagnano et al. |
| 2004/0259533 A1 | 12/2004 | Nixon et al. |
| 2005/0059379 A1 | 3/2005 | Sovio et al. |
| 2005/0071708 A1 | 3/2005 | Bartfai et al. |
| 2005/0102562 A1 | 5/2005 | Shinohara et al. |
| 2005/0141553 A1 | 6/2005 | Kim et al. |
| 2005/0201349 A1 | 9/2005 | Budampati |
| 2005/0228509 A1 | 10/2005 | James |
| 2005/0254653 A1 | 11/2005 | Potashnik et al. |
| 2005/0281215 A1 | 12/2005 | Budampati et al. |
| 2005/0289553 A1 | 12/2005 | Miki |
| 2006/0002368 A1 | 1/2006 | Budampati et al. |
| 2006/0015641 A1 | 1/2006 | Ocko et al. |
| 2006/0039347 A1 | 2/2006 | Nakamura et al. |
| 2006/0083200 A1 | 4/2006 | Emeott et al. |
| 2006/0104301 A1 | 5/2006 | Beyer et al. |
| 2006/0128349 A1 | 6/2006 | Yoon |
| 2006/0171344 A1 | 8/2006 | Subramanian et al. |
| 2006/0171346 A1 | 8/2006 | Kolavennu et al. |
| 2006/0227729 A1 | 10/2006 | Budampati et al. |
| 2006/0233204 A1 | 10/2006 | Pomaranski et al. |
| 2006/0256740 A1 | 11/2006 | Koski |
| 2006/0271814 A1 | 11/2006 | Fung et al. |
| 2006/0274644 A1 | 12/2006 | Budampati et al. |
| 2006/0274671 A1 | 12/2006 | Budampati et al. |
| 2006/0282498 A1 | 12/2006 | Muro |
| 2006/0287001 A1 | 12/2006 | Budampati et al. |
| 2007/0022317 A1 | 1/2007 | Chen et al. |
| 2007/0030816 A1 | 2/2007 | Kolavennu |
| 2007/0030832 A1 | 2/2007 | Gonia et al. |
| 2007/0067458 A1 | 3/2007 | Chand |
| 2007/0073861 A1 | 3/2007 | Amanuddin et al. |
| 2007/0076638 A1 | 4/2007 | Kore et al. |
| 2007/0077941 A1 | 4/2007 | Gonia et al. |
| 2007/0087763 A1 | 4/2007 | Budampati et al. |
| 2007/0091824 A1 | 4/2007 | Budampati et al. |
| 2007/0091825 A1 | 4/2007 | Budampati et al. |
| 2007/0103303 A1 | 5/2007 | Shoarinejad |
| 2007/0147294 A1 | 6/2007 | Bose et al. |
| 2007/0153677 A1 | 7/2007 | McLaughlin et al. |
| 2007/0153789 A1 | 7/2007 | Barker, Jr. et al. |
| 2007/0155423 A1 | 7/2007 | Carmody et al. |
| 2007/0220367 A1 | 9/2007 | Smith et al. |
| 2007/0237137 A1 | 10/2007 | McLaughlin |
| 2007/0261052 A1 | 11/2007 | Bale et al. |
| 2007/0280178 A1 | 12/2007 | Hodson et al. |
| 2008/0043637 A1 | 2/2008 | Rahman |
| 2008/0140844 A1 | 6/2008 | Halpern |
| 2008/0267259 A1 | 10/2008 | Budampati et al. |
| 2008/0273547 A1 | 11/2008 | Phinney |
| 2009/0022121 A1 | 1/2009 | Budampati et al. |
| 2009/0034441 A1 | 2/2009 | Budampati et al. |
| 2009/0058457 A1 | 3/2009 | Goodnow et al. |
| 2009/0060192 A1 | 3/2009 | Budampati et al. |
| 2009/0086692 A1 | 4/2009 | Chen |
| 2009/0109889 A1 | 4/2009 | Budampati et al. |
| 2009/0138541 A1 | 5/2009 | Wing et al. |
| 2010/0042869 A1 | 2/2010 | Szabo et al. |
| 2010/0128699 A1 | 5/2010 | Yang et al. |
| 2010/0191869 A1 | 7/2010 | Kase |
| 2010/0287548 A1 | 11/2010 | Zhou et al. |
| 2010/0306601 A1 | 12/2010 | Kranz et al. |
| 2011/0258433 A1 | 10/2011 | Pulini et al. |
| 2011/0276190 A1 | 11/2011 | Lillis et al. |
| 2011/0305206 A1 | 12/2011 | Junell et al. |
| 2012/0101663 A1 | 4/2012 | Fervel et al. |
| 2012/0117416 A1 | 5/2012 | McLaughlin |
| 2012/0120791 A1 | 5/2012 | Ananda Ganesan et al. |
| 2013/0007319 A1 | 1/2013 | Decker |
| 2014/0047139 A1 | 2/2014 | Okita |
| 2014/0097700 A1 | 4/2014 | Law et al. |

FOREIGN PATENT DOCUMENTS

| | | | |
|---|---|---|---|
| EP | 1 081 895 | A1 | 3/2001 |
| EP | 1 401 171 | A2 | 3/2004 |
| EP | 1 439 667 | A2 | 7/2004 |
| GB | 2 427 329 | A | 12/2006 |
| WO | WO 01/35190 | A2 | 5/2001 |
| WO | WO 03/079616 | A1 | 9/2003 |
| WO | WO 2004/047385 | A2 | 6/2004 |
| WO | WO 2004/114621 | A1 | 12/2004 |
| WO | WO 2006/017994 | A1 | 2/2006 |
| WO | WO 2006/053041 | A1 | 5/2006 |
| WO | WO 2011/025511 | A1 | 3/2011 |

OTHER PUBLICATIONS

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

Ying Zhang, et al., "A Learning-based Adaptive Routing Tree for Wireless Sensor Networks", Journal of Communications, vol. 1, No. 2, May 2006, p. 12-21.

Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.

Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.

"XYR 5000 Wireless Transmitters, Honeywell Solutions for Wireless Data Acquisiton and Monitoring," www.acs.honeywell.com, Feb. 2006, 6 pages.

(56) References Cited

OTHER PUBLICATIONS

Communication pursuant to Article 94(3) EPC dated Apr. 2, 2009 in connection with European Patent Application No. 07 761 784.3.
A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.
International Search Report and Written Opinion of the International Searching Authority in PCT Application No. PCT/US2007/069717 dated Dec. 10, 2007.
International Search Report and Written Opinion of the International Searching Authority in PCT Application No. PCT/US2007/069614 dated Nov. 22, 2007.
International Search Report and Written Opinion of the International Searching Authority in PCT Application No. PCT/US2007/069710 dated Nov. 27, 2007.
International Search Report and Written Opinion of the International Searching Authority in PCT Application No. PCT/US2007/069705 dated Apr. 15, 2008.
Pereira, J.M. Dias, "A Fieldbus Prototype for Educational Purposes", IEEE Instrumentation & Measurement Magazine, New York, NY vol. 7, No. 1, Mar. 2004, p. 24-31.
International Search Report and Written Opinion of the International Searching Authority in PCT Application No. PCT/US2006/048334 dated Jul. 5, 2007.
European Search Report dated Oct. 6, 2008 in connection with European Patent Application No. 08 16 1387.
Dinesh Kumar KN, "Partial Redundancy for I/O Modules or Channels in Distributed Control Systems", U.S. Appl. No. 13/767,661, filed Feb. 14, 2013.
International Search Report dated Feb. 25, 2015 in connection with International Application No. PCT/US2014/046697; 3 pages.
Written Opinion of International Searching Authority dated Feb. 25, 2015 in connection with International Application No. PCT/US2014/046697; 6 pages.

\* cited by examiner

APPARATUS AND METHOD FOR SYNCHRONIZING DYNAMIC PROCESS DATA ACROSS REDUNDANT INPUT/OUTPUT MODULES

TECHNICAL FIELD

This disclosure relates generally to synchronization systems. More specifically, this disclosure relates to an apparatus and method for synchronizing dynamic process data across redundant input/output (I/O) modules.

BACKGROUND

Controllers are widely used in process control applications. A controller is typically configured to receive process measurements from one or more sensors and generate control signals for one or more actuators. The controller typically adjusts the one or more actuators in order to keep one or more process variables at or near desired setpoint value(s). Input/output (I/O) modules are often used to transport data to and from controllers or other devices in process control applications. The I/O modules are normally used to process the data in some way, such as by performing analog-to-digital or digital-to-analog conversion.

SUMMARY

This disclosure provides an apparatus and method for synchronizing dynamic process data across redundant input/output (I/O) modules.

In a first embodiment, a method includes receiving first data at a first I/O module from a second I/O module, where the first data defines a programmable device configuration. The method also includes configuring a programmable device in the first I/O module based on the first data, where the programmable device is associated with a first I/O channel of the first I/O module. The method further includes receiving second data at the first I/O module from the second I/O module, where the second data is associated with a second I/O channel of the second I/O module. In addition, the method includes synchronizing the first I/O channel with the second I/O channel based on the second data.

In a second embodiment, an apparatus includes a first I/O module, which includes a programmable device associated with a first I/O channel and a control unit. The control unit is configured to receive first data from a second I/O module, where the first data defines a programmable device configuration. The control unit is also configured to configure the programmable device based on the first data. The control unit is further configured to receive second data from the second I/O module, where the second data is associated with a second I/O channel of the second I/O module. In addition, the control unit is configured to synchronize the first I/O channel with the second I/O channel based on the second data.

In a third embodiment, a method includes storing first data defining a configuration of a programmable device in a first input/output (I/O) module, where the programmable device is associated with a first I/O channel. The method also includes storing second data associated with the first I/O channel. The method further includes, during a synchronization process, transmitting the first and second data to a second I/O module.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
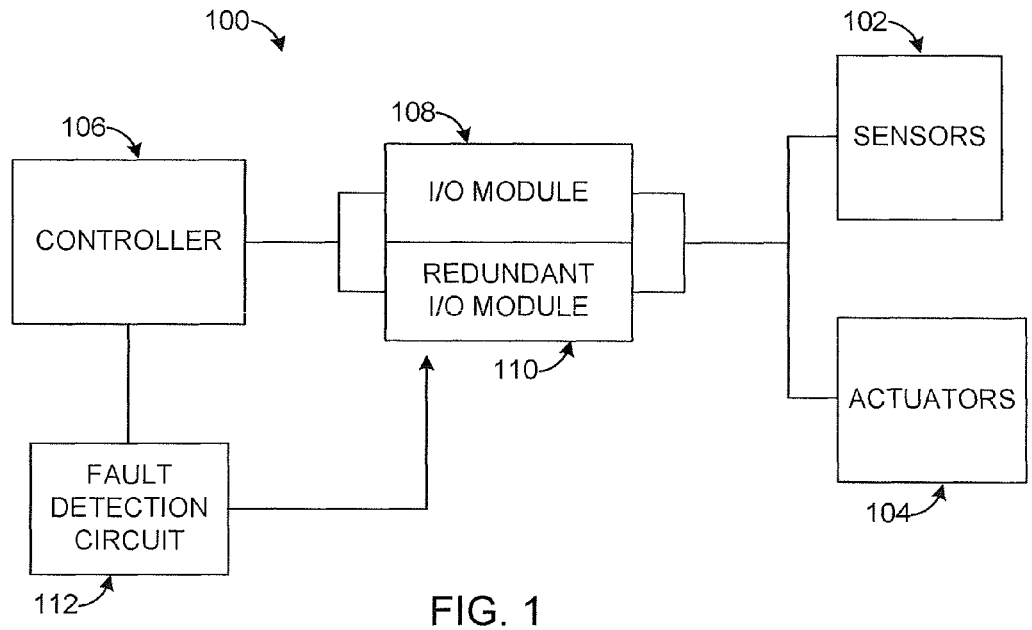
FIG. 1 illustrates a portion of an example process control system supporting synchronization of dynamic process data across redundant input/output (I/O) modules according to this disclosure.

FIG. 1 illustrates a portion of an example process control system 100 supporting synchronization of dynamic process data across redundant input/output (I/O) modules according to this disclosure. As shown in FIG. 1, the system 100 includes one or more sensors 102, one or more actuators 104, and one or more controllers 106. Each sensor 102 measures at least one characteristic of a process system. For example, a sensor 102 could measure temperature, pressure, flow rate, material composition, vibration, or any other or additional characteristic(s). Each sensor 102 includes any suitable structure for measuring one or more characteristics associated with a process system. A process system represents any system or portion thereof configured to process one or more materials in some manner.

Each actuator 104 performs one or more actions to modify at least one characteristic of a process system. For example, an actuator 104 could adjust the operation of a valve, motor, pump, or other industrial equipment within the process system. Each actuator 104 includes any suitable structure for modifying one or more characteristics associated with a process system.

Each controller 106 receives data from one or more sensor(s) 102 and uses the data to control one or more actuator(s) 104. For example, a controller 106 could use the sensor measurements and a model representing the expected behavior of a process variable. The controller 106 could then generate a control signal for an actuator that affects the process variable. Ideally, the controller 106 can do this in order to keep one or more process variables at or near one or more desired setpoint values. Each controller 106 includes any suitable structure for controlling industrial equipment, such as a controller that implements model predictive control (MPC) or other control technology.

The system 100 also includes at least one I/O module 108 and at least one redundant I/O module 110. Each I/O module 108 represents a primary I/O module used to pass data between the controller(s) 106 and the sensor(s) 102/actuator(s) 104. Each redundant I/O module 110 represents a secondary or backup I/O module that can used to pass data between the controller(s) 106 and the sensor(s) 102/actuator(s) 104 if and when the primary I/O module 108 fails. Each I/O module 108-110 can further provide various processing functions, such as analog-to-digital conversion, digital-to-analog conversion, or pulse counting. Each I/O module 108-110 includes any suitable structure configured to receive signals from a source and to provide signals to a destination (possibly after converting the signals to a different form).

Note that any number of I/O modules 108 and any number of redundant I/O modules 110 could be used in the system 100, and those numbers may or may not be equal. For example, there could be a 1:1 mapping where each I/O module 108 has an associated redundant I/O module 110. There could also be a mapping where only some of the I/O modules 108 have associated redundant I/O modules 110. As a particular example, only the I/O modules 108 associated with critical control data could have associated redundant I/O modules 110.

Also note that while the I/O module 108 and the redundant I/O module 110 are shown as separate elements in FIG. 1, an I/O module could function in different roles or modes at different times. For example, an I/O module could function in the primary role (I/O module 108) during some time periods and in the redundant role (I/O module 110) during other time times. The use of separate modules 108-110 in FIG. 1 is merely meant to illustrate the use of primary and redundant I/O elements.

In particular embodiments, the controller 106 and the I/O modules 108-110 are arranged in a bidirectional multi-drop network using a master-slave protocol. The controller 106 can function as a communication master device, and the I/O modules 108-110 can function as communication slave devices.

A fault detection circuit 112 is used to detect a fault condition in an I/O module 108 and trigger a switchover to the associated redundant I/O module 110. For example, a fault may occur in an I/O module 108, such as due to a power failure, a hardware failure, or a software/firmware fault. The fault condition may be detected by the fault detection circuit 112, which can signal the controller 106. The controller 106 can then cause the associated redundant I/O module 110 to assume primary operation. Alternatively, the fault detection circuit 112 could cause the reconfiguration of the I/O modules. In this way, the failure of an I/O module 108 can be quickly remedied, reducing or minimizing disruptions to the process control operation. The fault detection circuit 112 includes any suitable structure for identifying a fault with at least one I/O module.

In order to support the use of a redundant I/O module 110, the primary and redundant I/O modules 108-110 are synchronized. This allows the redundant I/O module 110 to take over operation substantially immediately upon a failure of the primary I/O module 108. In conventional systems, I/O modules include discrete circuitry that handles input or output signals in one or more channels, where the discrete circuitry in a secondary I/O module matches the discrete circuitry in a primary I/O module. Because the circuitry was designed to be the same, the conventional I/O modules could be synchronized simply by synchronizing the configuration databases of the conventional I/O modules. A configuration database defines the setup and operation of one or more I/O channels. By synchronizing the configuration databases of the primary and redundant I/O modules, the redundant I/O module could easily take over operation for a primary I/O module.

Newer I/O modules include programmable devices, such as field programmable gate arrays. Each programmable device performs the input and output signal processing operations for an I/O channel. These I/O modules need not have discrete circuitry for each channel. Instead, the programmable device for each channel is reconfigurable into a number of different configurations. This creates difficulty in synchronizing primary and redundant I/O modules.

In accordance with this disclosure, during the synchronization process, a programmable device in a redundant I/O module 110 is configured to match the configuration of an associated programmable device in a primary I/O module 108. This is done in addition to synchronizing the configuration databases of the I/O modules 108-110. For example, the programmable devices in the redundant I/O module 110 can be reconfigured before each I/O channel's data in the primary I/O module's configuration database is sent from the primary I/O module 108 to the redundant I/O module 110. This can help to ensure that each I/O channel's hardware in the redundant I/O module 110 is configured properly before that I/O channel's data is synchronized with the corresponding channel in the primary I/O module 108. In this way, the redundant I/O module 110 can be rapidly reconfigured and synchronized in order to take over operation of the primary I/O module 108.

Moreover, when conventional I/O modules are used in a redundant configuration, the I/O modules typically calculate the same process variable value independently and provide substantially the same value for use by a controller. For example, if two conventional I/O modules receive the same analog input signal and perform analog-to-digital conversion, the outputs of the two I/O modules would typically be substantially equal (assuming each module is operating properly). As a result, switching from one I/O module to the other could be done without causing severe process interruptions since a controller or actuator would not see a large change in its input.

This may not be the case with newer I/O modules. For example, some newer I/O modules operate by receiving an analog or digital input signal and counting the number of pulses in the input signal using a counter. Situations can therefore easily arise where the number of pulses counted by a primary I/O module differs from the number of pulses counted by a redundant I/O module. This most often occurs when I/O module 110 is powered after I/O module 108 has been loaded with its configuration and started operation. In this case, the counter output in the redundant I/O module 110 is almost guaranteed to be different than the counter output in the primary I/O module 108.

In accordance with this disclosure, one or more measurement values from a primary I/O module 108 are transferred to a redundant I/O module 110 as part of the synchronization process. The measurement values from the primary I/O module 108 are used to update the I/O channel(s) in the redundant I/O module 110. For example, a difference between counter values in the primary and redundant I/O modules 108-110 could be identified and used to update the counter in the redundant I/O module 110. Once again, this can help to facilitate a switchover from primary to backup I/O modules with little or no interruption in the control of an industrial process.

Additional details about synchronizing I/O modules are provided below. The synchronization technique described here could be used to support any number of redundant I/O modules 110 in any suitable system.

Although FIG. 1 illustrates a portion of one example process control system 100 supporting synchronization of dynamic process data across redundant I/O modules, various changes may be made to FIG. 1. For example, the system 100 could include any number of sensors, actuators, controllers, primary and redundant I/O modules, and fault detection circuits. Also, the functional division shown in FIG. 1 is for illustration only. Various components in FIG. 1 could be combined, subdivided, or omitted and additional components could be added according to particular needs. For instance, the fault detection circuit 112 may be incorporated into one or more of the I/O modules 108-110 or in the controller 106. Further, while shown as coupling both sensors and actuators to a controller, an I/O module could couple only sensors to a controller or be used in any other suitable manner. In addition, the primary and redundant I/O modules are not limited to use with sensors, actuators, and controllers. The synchronization technique described in this document could be used with primary and redundant I/O modules that support communications between any suitable source(s) and destination(s).

Figure 2:
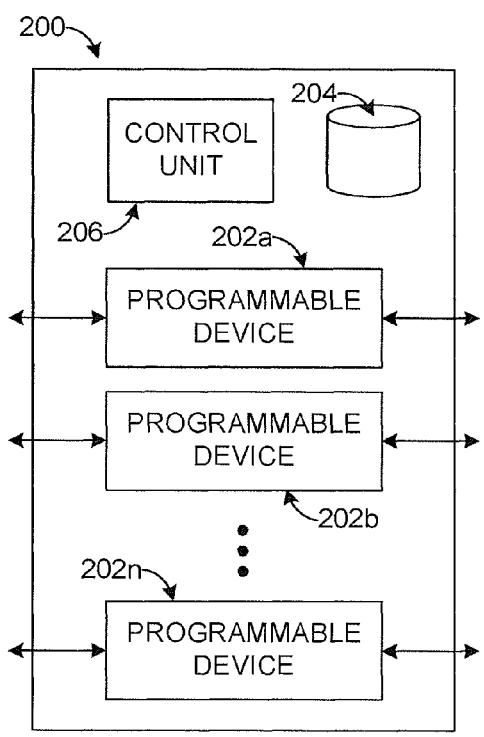
FIG. 2 illustrates an example I/O module supporting synchronization of dynamic process data according to this disclosure.

FIG. 2 illustrates an example I/O module 200 supporting synchronization of dynamic process data according to this disclosure. The I/O module 200 could, for instance, represent an example implementation of the I/O module(s) 108 or the redundant I/O module(s) 110 in FIG. 1. Note, however, that the I/O module 200 could be used in any other suitable system.

As shown in FIG. 2, the I/O module 200 includes one or more programmable devices 202a-202n. As noted above, each programmable device 202a-202n performs the input and output signal processing operations for an I/O channel. For example, a programmable device 202a-202n could receive a digital or analog input signal, count a number of pulses in the input signal using a counter, and output a digital value identifying the counted number of pulses. A programmable device 202a-202n could also perform any other suitable operations. Each programmable device 202a-202n includes any suitable programmable structure supporting signal processing operations. Each programmable device 202a-202n could, for instance, represent a field programmable gate array (FPGA), complex programmable logic device (CPLD), digital signal processor, or Flash memory or other non-volatile memory device.

The I/O module 200 could include a single programmable device 202a to support a single I/O channel. The I/O module 200 could also include multiple programmable devices 202a-202n to support multiple I/O channels. Each I/O channel could be used to pass data between any suitable devices or systems.

The I/O module 200 also includes a memory 204 and a control unit 206. The memory 204 can be used to store various information associated with the I/O module 200. For example, the memory 204 could store the configuration database for the I/O module 200, where the configuration database defines the setup and operation of the I/O channel(s). The memory 204 could also store data defining the configuration of each programmable device 202a-202n and any measurement data (such as counter values) associated with each programmable device 202a-202n. The memory 204 includes any suitable storage and retrieval device(s).

The control unit 206 uses this information to support redundancy operations involving the I/O module 200. For example, if the I/O module 200 is operating in the primary mode (as an I/O module 108), the control unit 206 can collect information for the configuration database, the programmable device configuration(s), and the measurement value(s) and store that information in the memory 204. The control unit 206 can also transmit that information to a redundant I/O module 110 when necessary.

If the I/O module 200 is operating in the redundant mode (as an I/O module 110), the control unit 206 can receive information for the configuration database, the programmable device configuration(s), and the measurement value(s) from a primary I/O module 108. The control unit 206 uses the programmable device configuration(s) to reconfigure the programmable device(s) 202a-202n. The control unit 206 also uses the configuration database to configure the I/O channel(s) properly. The control unit 206 further uses the measurement value(s) to update the programmable device(s) 202a-202n to be substantially synchronized with the operation of the primary I/O module 108.

The control unit 206 includes any suitable structure for controlling operation of an I/O module. The control unit 206 could, for example, represent a microprocessor, microcontroller, digital signal processor, FPGA, application specific integrated circuit (ASIC), or other processing or computing device.

Although FIG. 2 illustrates one example of an I/O module 200 supporting synchronization of dynamic process data, various changes may be made to FIG. 2. For example, the I/O module 200 could include any number of programmable devices in any suitable configuration to support any number of I/O channels. Also, the functional division shown in FIG. 2 is for illustration only. Various components in FIG. 2 could be combined, subdivided, or omitted and additional components could be added according to particular needs.

Figure 3:
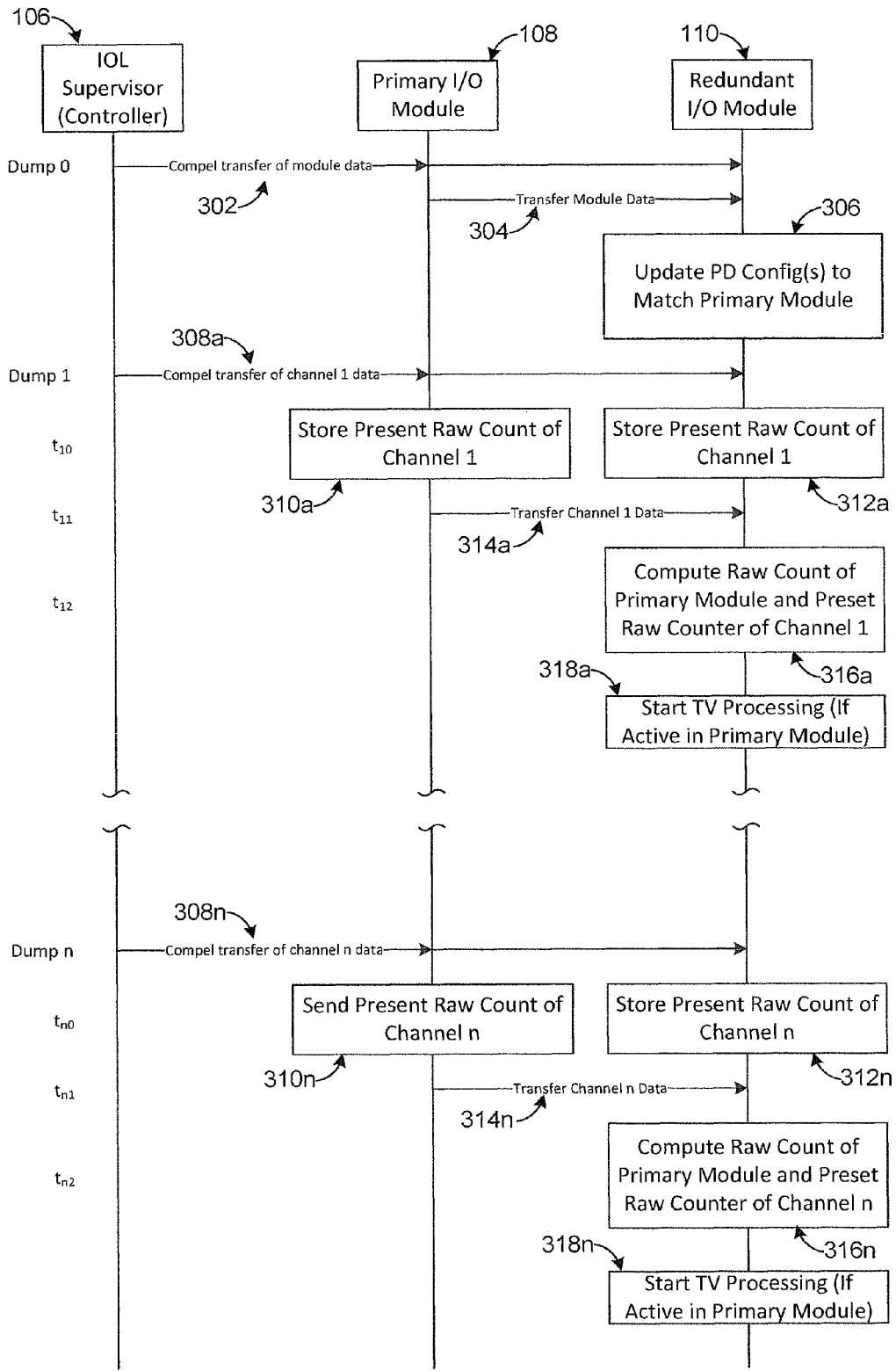
FIG. 3 illustrates an example synchronization of dynamic process data across redundant I/O modules according to this disclosure.

FIG. 3 illustrates an example synchronization of dynamic process data across redundant I/O modules according to this disclosure. In this example, the synchronization is controlled by an I/O link (IOL) supervisor, which in this case can be a controller 106 of FIG. 1. The I/O modules being synchronized are a primary I/O module 108 and a redundant I/O module 110 in FIG. 1. Note, however, that the synchronization technique could be used in any other suitable system.

In some embodiments, the synchronization technique generally occurs as follows. First, one or more programmable devices 202a-202n of the redundant I/O module 110 are reconfigured using data from the primary I/O module 108. The configuration(s) of the programmable device(s) 202a-202n can be stored in the primary I/O module's database (sometimes referred to as the "slot 0" database). Each programmable device (each I/O channel) could have its own record in the database. These database records can be the first sent to the redundant I/O module 110 during the synchronization process. Once received from the primary I/O module 108, the programmable device(s) 202a-202n in the redundant I/O module 110 can be configured based on the received database record(s). The reconfiguration of the programmable device(s) 202a-202n can occur first since the I/O channel data to be transferred next may rely on the programmable device(s) 202a-202n being properly configured. Once the one or more programmable devices 202a-202n are properly configured, each individual I/O channel can be synchronized.

The transfer of the initial programmable device configuration(s) and the subsequent transfer(s) of I/O channel information may be referred to as data "dumps." Also, each device involved in the synchronization process could transmit data by placing the data into an IOL transmit buffer for transmission, and each device could process data received in its IOL receive buffer.

As shown in FIG. 3, the synchronization technique begins with an initial data dump ("Dump 0"), where the controller 106 sends a message 302 compelling the transfer of "module data" to the primary and redundant I/O modules 108-110. The module data represents the database record(s) identifying the configuration(s) of the programmable device(s) 202a-202n in the primary I/O module 108. The message 302 is received by both I/O modules 108-110, allowing the primary I/O module 108 to prepare to send the data and the redundant I/O module 110 to prepare to receive the data.

The primary I/O module 108 sends the module data to the redundant I/O module 110 in one or more messages 304. Each message 304 could include one or multiple database records. The redundant I/O module 110 uses the module data during operation 306 to configure the programmable device(s) 202a-202n in the redundant I/O module 110. At the end of the operations 306, the programmable device(s) 202a-202n in the redundant I/O module 110 can have the same operational configuration as the programmable device(s) 202a-202n in the primary I/O module 108.

The synchronization technique then transfers each I/O channel's data to the redundant I/O module 108, where each I/O channel's data is sent in a separate dump operation ("Dump 1" through "Dump n"). For the first I/O channel, the controller 106 sends a message 308a compelling the transfer of "channel 1" data to the primary and redundant I/O modules 108-110. In response, the primary I/O module 108 stores its measurement data for the first I/O channel during operation 310a, and the redundant I/O module 110 stores its measurement data for the first I/O channel during operation 312a. These values can be sampled at substantially the same time. In this example, this includes each I/O module 108-110 storing its counter value, although other measurement data could be used.

The primary I/O module 108 then sends the "channel 1" data to the redundant I/O module 110 in one or more messages 314a. The redundant I/O module 110 can retrieve the data and calculate an offset during operation 316a. The offset can be calculated as the difference between the value stored by the primary I/O module 108 in operation 310a and the value stored by the redundant I/O module 110 in operation 312a. The offset could be used in any suitable manner, such as by adding the offset value to the counter in the redundant I/O module 110 or storing the offset value for later use. Note, however, that the offset or the value from the primary I/O module 108 could be used in any suitable manner.

At this point, the first I/O channel in the redundant I/O module 110 is ready for use, and target value (TV) processing can commerce during operation 318a (assuming that the primary I/O module 108 had been performed TV processing prior to the switchover). Target value processing can involve a user setting a target value that is compared against the accumulated counter value, which represents the input pulse count. When the accumulated value reaches or exceeds the target value, some action can be taken, such as toggling an output value and resetting the counter.

The same process could be repeated for all remaining I/O channels. In FIG. 3, for example, operations 308n-318n are repeated for "channel n." At the end of this procedure, all n I/O channels of the redundant I/O module 110 have been synchronized with the I/O channels of the primary I/O module 108. Note that the number of dumps shown in FIG. 3 is for illustration only and that fewer data dumps or channels, perhaps even a single data dump or channel, may be synchronized.

As can be seen in FIG. 3, times $t_{x0}$, $t_{x1}$, and $t_{x2}$ are shown for each I/O channel dump (where x denotes the I/O channel number). In this example embodiment, the recording of the counter value for each I/O channel dump occurs at time $t_{x0}$. In particular embodiments, the time $t_{x0}$ denotes the time of a "gap has occurred" event. Depending on the implementation, the "gap has occurred" event can be represented by a hardware signal that indicates there is no traffic on an I/O link. It is conventionally used by firmware to know when a message is complete. Because it is generated digitally, the "gap has occurred" event can be detected at essentially the same time at each I/O module on the I/O link. Any skew between when the "gap has occurred" event is detected in different I/O modules could be very small, such as due to (i) a difference in propagation times of different transceivers and (ii) a difference in clock frequencies in different devices. The small skew allows the counter outputs in the different I/O modules 108-110 to be sampled at essentially the same time, which allows an accurate offset between the counters to be determined. The channel data for each I/O channel dump is transmitted from the primary I/O module 108 starting at time $t_{x1}$, and the reception of the channel data for each I/O channel dump is completed at the redundant I/O module 110 at time $t_{x2}$.

As can be seen here, the synchronization technique can have various benefits depending on the implementation. For example, the use of the "gap has occurred" event for sampling counter values can reduce or eliminate the need for special synchronization mechanisms in the I/O modules. Also, very little burden is placed on the controller 106 or the programmable devices 202a-202n to support this functionality. Further, no special inter-module signaling is required, just the communication of data messages through conventional IOL transmit and receive buffers. Finally, the I/O modules 108-110 may not require a large amount of programming code to implement the failover functionality.

Although FIG. 3 illustrates one example of the synchronization of dynamic process data across redundant I/O modules, various changes may be made to FIG. 3. For example, the "gap has occurred" event represents one of various ways in which the sampling of counter values or other measurement values can be synchronized in different I/O modules. Also, as noted above, counter values are one of various types of measurement data that could be synchronized across multiple I/O modules. Moreover, the synchronization of measurement data need not occur at all if the redundant I/O module 110 already has substantially the same data (such as when both I/O modules perform analog-to-digital or digital-to-analog conversion of the same input signal).

Figure 4:
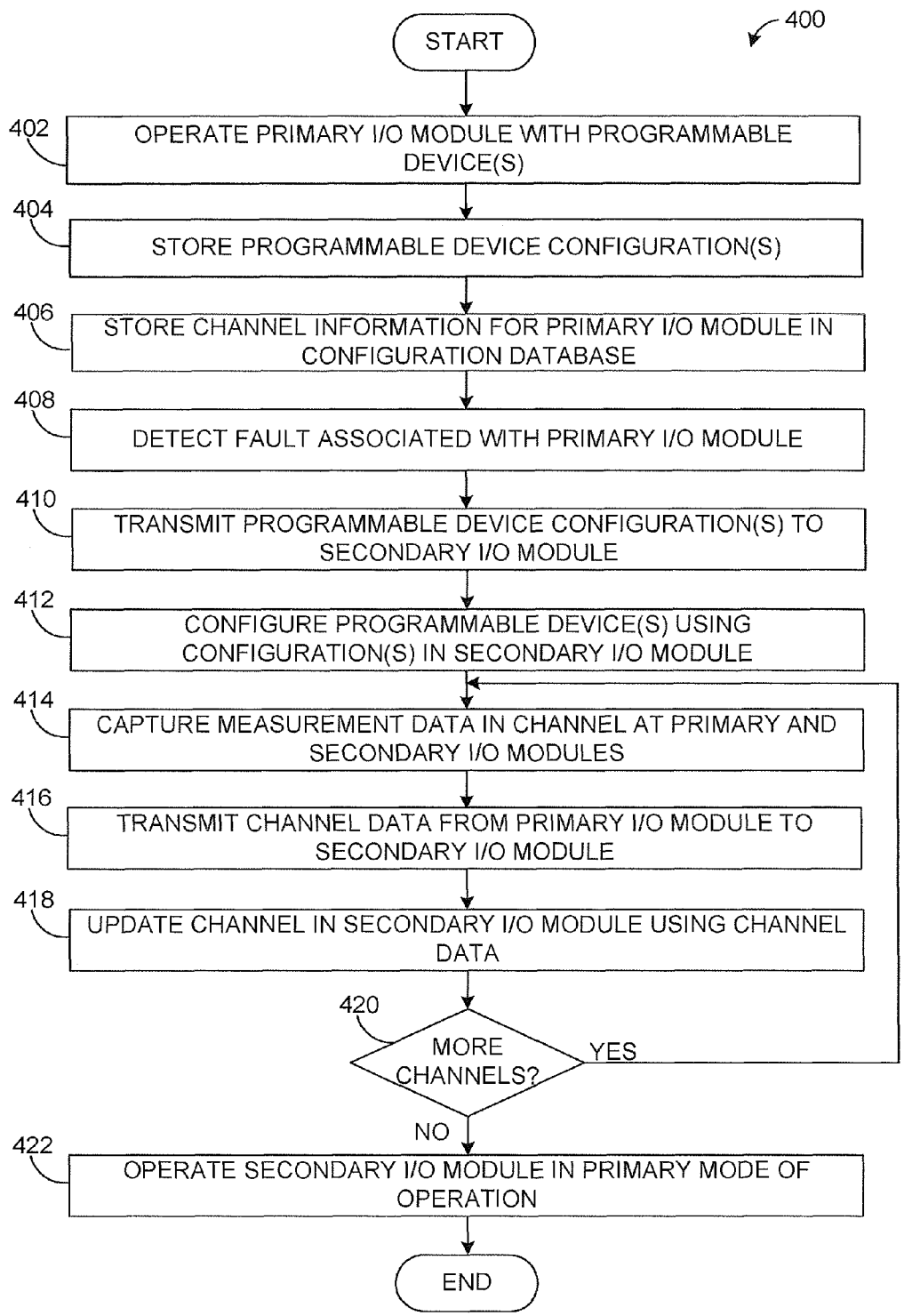
FIG. 4 illustrates an example method for synchronizing dynamic process data across redundant I/O modules according to this disclosure.

FIG. 4 illustrates an example method 400 for synchronizing dynamic process data across redundant I/O modules according to this disclosure. As shown in FIG. 4, a primary I/O module with one or more programmable devices is operated at step 402. This could include, for example, operating the primary I/O module 108 with one or more programmable devices 202a-202n. The programmable device(s) 202a-202n can be used to facilitate communications over one or more I/O channels. One or more configurations of the one or more programmable devices are stored at step 404. This could include, for example, the control unit 206 in the primary I/O module 108 storing a data record for each I/O channel in the memory 204, where the data record identifies the configuration of the programmable device associated with that I/O channel. Information associated with each I/O channel of the primary I/O module is stored in a configuration database at step 406. This could include, for example, the control unit 206 storing information defining each I/O channel supported by the primary I/O module 108 in the memory 204.

A fault associated with the primary I/O module is detected at step 408. This could include, for example, the fault detection circuit 112 detecting a fault with the primary I/O module 108. The fault could also be detected by any other suitable device, such as by the controller 106 or by the primary I/O module 108 itself.

The one or more stored configurations of the programmable device(s) in the primary I/O module are transmitted to a secondary I/O module at step 410. This could include, for example, the primary I/O module 108 sending the database record(s) associated with the configuration(s) of the programmable device(s) 202a-202n to the redundant I/O module 110. The secondary I/O module uses the data to reconfigure its programmable device(s) at step 412. This could include, for example, the control unit 206 in the redundant I/O module 110 receiving the data record for each I/O channel from the primary I/O module 108 and reconfiguring the programmable device 202a-202n for that I/O channel based on the data record.

Measurement data for an I/O channel is captured at both the primary and secondary I/O modules at step 414. This could include, for example, the control unit 206 or other component sampling the output of a counter implemented in a programmable device for a selected I/O channel. Any other suitable data could also be sampled. The sampling could occur upon a "gap has occurred" event in order to help synchronize the sampling, although other sampling synchronization techniques could be used. Channel data for the I/O channel is sent from the primary I/O module to the secondary I/O module at step 416. The channel data can include the data from the configuration database, as well as the value sampled at the primary I/O module 108. The same I/O channel is updated in the secondary I/O module using the data from the primary I/O module at step 418. This could include, for example, updating the counter in the same I/O channel of the redundant I/O module 110 using the counter value from the primary I/O module 108.

A determination is made whether there are more channels to be synchronized at step 420. If so, a new channel is selected, and the process returns to step 414. Otherwise, the secondary I/O module has been synchronized with the primary I/O module, and the secondary I/O module can operate in a primary mode at step 422. The primary I/O module 108 that experienced the fault can remain out of service until repaired or replaced, at which point the new I/O module could begin functioning as a primary or secondary I/O module.

Although FIG. 4 illustrates one example of a method 400 for synchronizing dynamic process data across redundant I/O modules, various changes may be made to FIG. 4. For example, while shown as a series of steps, various steps in FIG. 4 could overlap, occur in parallel, occur in a different order, or occur any number of times. As a particular example, steps 402-406 and 410-420 could occur prior to a fault being detected so that the secondary I/O module is immediately ready to assume primary operation when a fault occurs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving first data at a first input/output (I/O) module from a second I/O module, the first data defining a programmable device configuration;
   configuring a programmable device in the first I/O module based on the first data, the programmable device associated with a first I/O channel of the first I/O module, wherein the programmable device implements a counter configured to count pulses in an input signal and output a first counter value;
   receiving second data at the first I/O module from the second I/O module, the second data associated with a second I/O channel of the second I/O module, the second data comprising a second counter value associated with the second I/O channel; and
   synchronizing the first I/O channel with the second I/O channel based on the second data, wherein the synchronizing comprises updating the counter based on the second counter value.

2. The method of claim 1, further comprising:
   sampling the first counter value at the first I/O module at substantially a same time that the second counter value is sampled at the second I/O module.

3. A method comprising:
   receiving first data at a first input/output (I/O) module from a second I/O module, the first data defining a programmable device configuration;
   configuring a programmable device in the first I/O module based on the first data, the programmable device associated with a first I/O channel of the first I/O module;
   receiving second data at the first I/O module from the second I/O module, the second data associated with a second I/O channel of the second I/O module; and
   synchronizing the first I/O channel with the second I/O channel based on the second data;
   wherein the first I/O module comprises multiple programmable devices supporting multiple first I/O channels; and
   wherein different ones of the programmable devices are configured based on different information contained in the first data.

4. The method of claim 3, further comprising:
receiving at the first I/O module multiple sets of second data, each set of second data associated with one of multiple second I/O channels of the second I/O module; and
synchronizing each first I/O channel with one of the second I/O channels based on one of the sets of second data.

5. The method of claim 4, wherein the first data is received and the programmable devices are configured before the sets of second data are received.

6. The method of claim 1, further comprising:
detecting a fault associated with the second I/O module.

7. A method comprising:
receiving first data at a first input/output (I/O) module from a second I/O module, the first data defining a programmable device configuration;
configuring a programmable device in the first I/O module based on the first data, the programmable device associated with a first I/O channel of the first I/O module;
receiving second data at the first I/O module from the second I/O module, the second data associated with a second I/O channel of the second I/O module;
synchronizing the first I/O channel with the second I/O channel based on the second data; and
detecting a fault associated with the second I/O module;
wherein the second I/O module operates as a primary I/O module and the first I/O module operates as a backup I/O module prior to the fault; and
wherein the first I/O module operates as the primary I/O module after the receipt of the first and second data, the configuration of the programmable device, and the synchronization of the first and second I/O channels.

8. An apparatus comprising a first input/output (I/O) module, the first I/O module comprising:
a programmable device associated with a first I/O channel, the programmable device configured to implement a counter, the counter configured to count pulses in an input signal and output a first counter value; and
a control unit configured to:
receive first data from a second I/O module, the first data defining a programmable device configuration;
configure the programmable device based on the first data;
receive second data from the second I/O module, the second data associated with a second I/O channel of the second I/O module, the second data comprising a second counter value associated with the second I/O channel; and
synchronize the first I/O channel with the second I/O channel based on the second data, wherein the control unit is configured to update the counter based on the second counter value.

9. The apparatus of claim 8, wherein the control unit is further configured to sample the first counter value at the first I/O module at substantially a same time that the second counter value is sampled at the second I/O module.

10. An apparatus comprising a first input/output (I/O) module, the first I/O module comprising:
a programmable device associated with a first I/O channel; and
a control unit configured to:
receive first data from a second I/O module, the first data defining a programmable device configuration;
configure the programmable device based on the first data;
receive second data from the second I/O module, the second data associated with a second I/O channel of the second I/O module; and
synchronize the first I/O channel with the second I/O channel based on the second data;
wherein the first I/O module comprises multiple programmable devices configured to support multiple first I/O channels; and
wherein the control unit is configured to configure different ones of the programmable devices based on different information contained in the first data.

11. The apparatus of claim 10, wherein the control unit is configured to:
receive multiple sets of second data, each set of second data associated with one of multiple second I/O channels of the second I/O module; and
synchronize each first I/O channel with one of the second I/O channels based on one of the sets of second data.

12. The apparatus of claim 11, wherein the control unit is configured to receive the first data and configure the programmable devices before receiving the sets of second data.

13. An apparatus comprising a first input/output (I/O) module, the first I/O module comprising:
a programmable device associated with a first I/O channel; and
a control unit configured to:
receive first data from a second I/O module, the first data defining a programmable device configuration;
configure the programmable device based on the first data;
receive second data from the second I/O module, the second data associated with a second I/O channel of the second I/O module; and
synchronize the first I/O channel with the second I/O channel based on the second data;
wherein the first I/O module is configured to operate as a backup I/O module prior to a fault with the second I/O module; and
wherein the first I/O module is configured to operate as a primary I/O module after the fault with the second I/O module.

14. A method comprising:
storing first data defining a configuration of a programmable device in a first input/output (I/O) module, the programmable device associated with a first I/O channel, wherein the programmable device implements a first counter configured to count pulses in an input signal and output a first counter value;
sampling the first counter value at the first I/O module at substantially a same time that a second counter value is sampled at a second I/O module;
storing second data associated with the first I/O channel, wherein the second data comprises the first counter value; and
during a synchronization process, transmitting the first and second data to the second I/O module.

15. A method comprising:
storing first data defining a configuration of a programmable device in a first input/output (I/O) module, the programmable device associated with a first I/O channel;
storing second data associated with the first I/O channel; and
during a synchronization process, transmitting the first and second data to a second I/O module;

wherein the first I/O module comprises multiple programmable devices supporting multiple first I/O channels; and wherein the first data comprises different records associated with different ones of the programmable devices.

16. The method of claim 15, further comprising:
transmitting to the second I/O module multiple sets of second data, each set of second data associated with one of the first I/O channels.

17. A method comprising:
storing first data defining a configuration of a programmable device in a first input/output (I/O) module, the programmable device associated with a first I/O channel;

storing second data associated with the first I/O channel; and during a synchronization process, transmitting the first and second data to a second I/O module;

wherein the first I/O module operates as a primary I/O module prior to a fault with the first I/O module; and wherein the first I/O module transmits the first and second data to the second I/O module to enable the second I/O module to operate as the primary I/O module after the fault with the first I/O module.

18. The apparatus of claim 8, wherein:
the first I/O module comprises multiple programmable devices configured to support multiple first I/O channels; and the control unit is configured to configure different ones of the programmable devices based on different information contained in the first data.

19. The apparatus of claim 8, wherein:
the first I/O module is configured to operate as a backup I/O module prior to a fault with the second I/O module; and the first I/O module is configured to operate as a primary I/O module after the fault with the second I/O module.

20. The method of claim 17, wherein:
the programmable device implements a counter configured to count pulses in an input signal and output a first counter value;

the second data comprises the first counter value; and the method further comprises sampling the first counter value at the first I/O module at substantially a same time that a second counter value is sampled at the second I/O module.

* * * * *